United States Patent
Defougeres et al.

(10) Patent No.: US 7,163,363 B2
(45) Date of Patent: Jan. 16, 2007

(54) PERFORATING DRILL

(75) Inventors: Francois Defougeres, Poligny (FR); Pierre Rigolet, Montholier (FR); Sylvain Lamy, Poligny (FR)

(73) Assignee: Diager (FR)

( * ) Notice: Subject to any disclaimer, the term of this patent is extended or adjusted under 35 U.S.C. 154(b) by 420 days.

(21) Appl. No.: 10/275,370

(22) PCT Filed: Apr. 26, 2001

(86) PCT No.: PCT/FR01/01288
§ 371 (c)(1),
(2), (4) Date: May 23, 2003

(87) PCT Pub. No.: WO01/85373
PCT Pub. Date: Nov. 15, 2001

(65) Prior Publication Data
US 2004/0052597 A1    Mar. 18, 2004

(30) Foreign Application Priority Data
May 5, 2000  (FR) .................................. 00 05813

(51) Int. Cl.
*B23B 51/00* (2006.01)
(52) U.S. Cl. ................... 408/230; 175/323; 175/394

(58) Field of Classification Search ................ 408/230, 408/227, 229; 175/323, 394, 395, 400, 415
See application file for complete search history.

(56) References Cited

U.S. PATENT DOCUMENTS

| | | | |
|---|---|---|---|
| 2,322,894 A | | 6/1943 | Stevens |
| 5,509,761 A | * | 4/1996 | Grossman et al. ............ 408/59 |
| 5,921,728 A | * | 7/1999 | Kammeraad et al. ....... 408/227 |
| 2003/0019667 A1 | * | 1/2003 | Peetz ......................... 175/395 |

FOREIGN PATENT DOCUMENTS

| | | |
|---|---|---|
| DE | 20 13 327 | 5/1971 |
| DE | 38 26 239 | 2/1990 |

OTHER PUBLICATIONS

International Search Report PCT/FR01/01288; Aug. 28, 2001.

\* cited by examiner

*Primary Examiner*—Monica Carter
*Assistant Examiner*—Sara Addisu
(74) *Attorney, Agent, or Firm*—Cantor Colburn LLP

(57) ABSTRACT

The invention concerns a drill including a generally cylindrical body, tipped with a head and provided, over at least part of its length, generally spiral evaporating grooves. The groove(s) are delimited, over at least part of their length, by a succession of facets, attached to one another, and linked to one another by sharp edges or by radius blends.

6 Claims, 4 Drawing Sheets

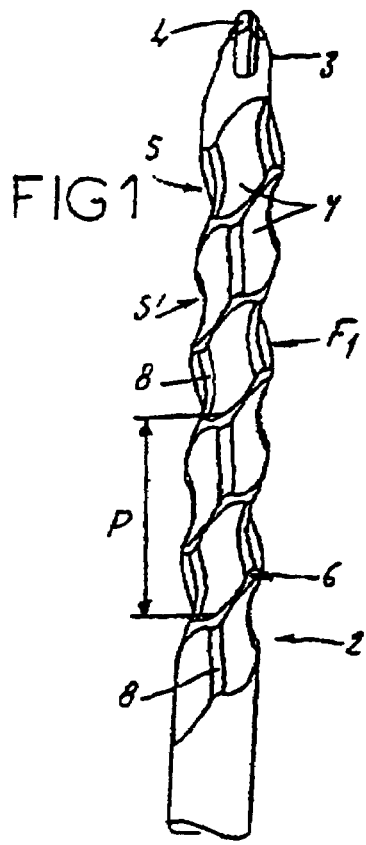
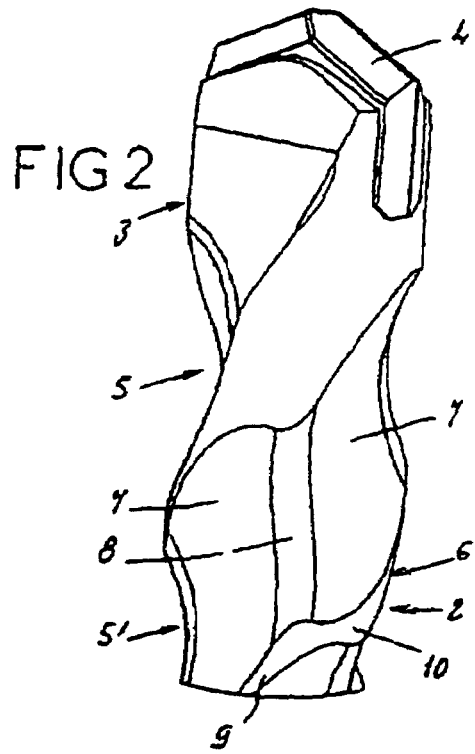
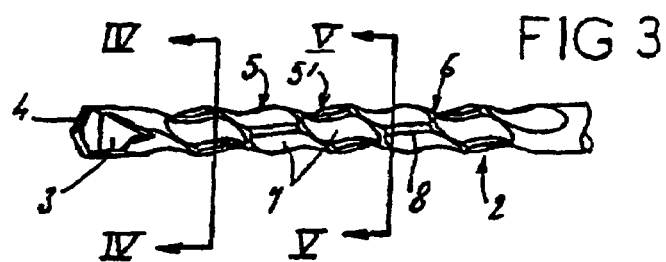
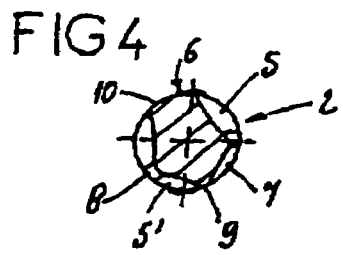
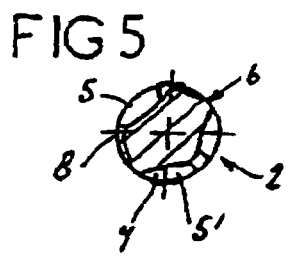

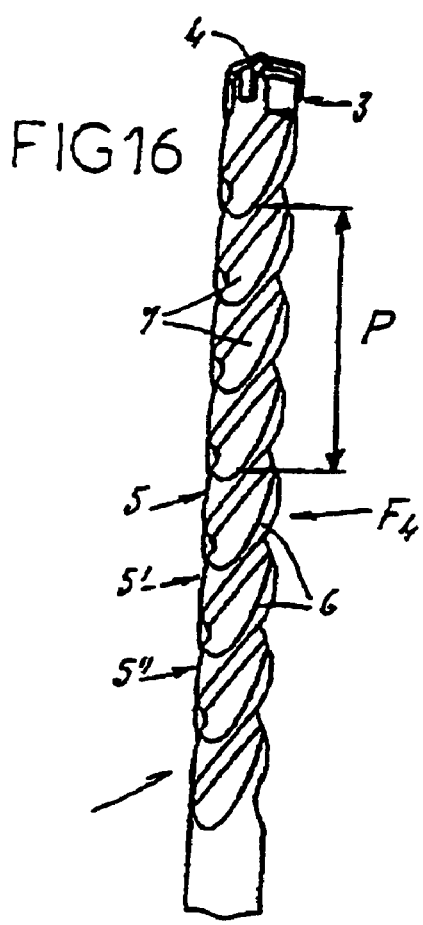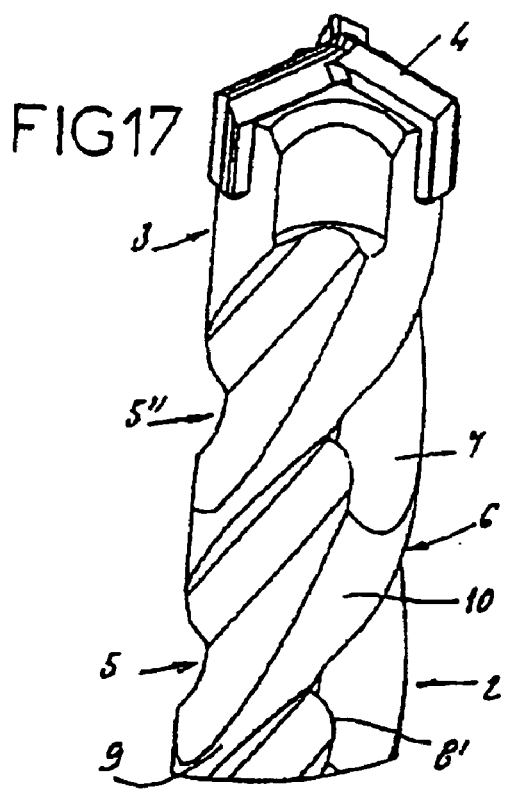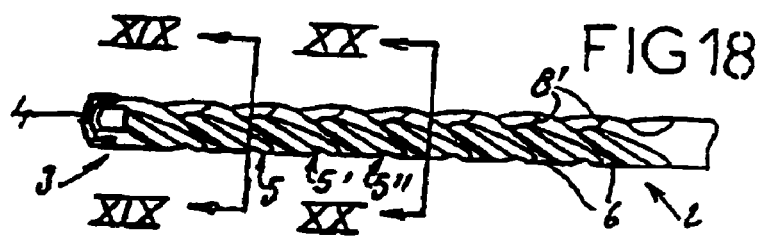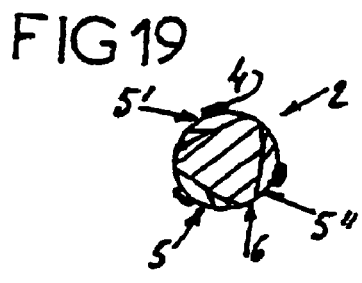

PERFORATING DRILL

The present invention relates in general to rotary boring tools and, more particularly, to perforating drills.

Boring tools and, in particular, drills usually have a body of cylindrical overall shape, ending in a head, and they generally have, over at least part of the length of their body, one or more spiral evacuation grooves intended to transport the residue (dust) formed during drilling away from the working area of the head and out of the bored hole. These grooves usually consist of one or more smooth spiral ramps which evacuate the dust by virtue of the rotational movement of the tool in accordance with the Archimedean screw principle. In this mode of evacuation, the drilling dust is "passive" and plays no part in the evacuation process.

Experience has shown that if the evacuation capacity of the grooves is insufficient, or is ineffective, dust can build up at the bottom of the hole being drilled; in this case, the particle size of this dust decreases and the fine particles thus created build up; they then block the evacuation spaces at the bottom of the hole and cause greater wear of the carbide insert and the steel present on the head of the drill and on the body of the tool. In addition, this build-up of dust causes the pressure at the bottom of the hole to rise. This last phenomenon may play a part in evacuation: what happens is that when the pressure exceeds a certain value, there is a phenomenon of relaxation (exhausting) of the built-up dust which is then evacuated from the working area. However, it is necessary to avoid excessive pressure rises by leaving a sufficient capacity of the evacuation grooves that these are not blocked, particularly near the head of the tool; excessive pressure rises at the bottom of the hole give rise to jerkiness during drilling, during the phenomena of the exhausting of the built-up dust (relaxation); this mode of operation is detrimental to the drill's performance, in terms of the speed of drilling on the one hand, and in terms of life on the other hand, because the successive rises in pressure at the drill head and/or in the cutting give rise to stresses which play a part in damaging this drill. At the present time, in drills, this rise in pressure is not channeled, and attempts are made to avoid it as far as possible by simply giving the grooves a good evacuation capacity.

Documents DE 3826239 A, U.S. Pat. No. 2,322,894 A and DE 2013327 B describe drills with helical grooves, of the kind concerned here, in which some or all of the surface of said grooves has striations or flutes, for various end-purposes: to reduce friction, to optimize the cutting operation, to optimize resharpening, to transport debris by vibration. In all these documents, the striations or flutes, which are small in size, correspond to a surface finish of a drill bit already roughed out, and their effect is that of a surface action. Obtaining said striations or flutes may also represent a complicated and expensive operation in the manufacture of these drill bits.

Confronted with this prior art, the object of the invention is to improve the performance of drilling tools, in terms of speed and life, while at the same time allowing a reduction in the cost of producing the tools concerned.

To this end, the subject of the invention is essentially a perforating drill in which the evacuation groove or grooves are delimited, over at least part of their length, by a succession of facets attached to one another.

Thus, the main idea behind the invention lies in the fact that the grooves for evacuating the dust, which originates from the material bored by the tool, no longer consist of a continuous spiral shape but consist of small successive faces known as "facets" connected together, and which may have various shapes. More specifically, the facets are obtained for the production of multiple grooves, along generatrices which may or may not be spiral, and which follow a path which alternately, regularly or irregularly, diverges from and converges toward the longitudinal axis of the drill bit. These generatrices, which are angularly and/or axially offset from one another, make it possible to generate dust evacuation grooves. The shapes of the facets defining the evacuation grooves may be regular or irregular, flat or concave or convex and of greater or lesser complexity. These facets may be joined together by sharp edges or via fillet radii, of convex or concave shape.

More particularly, the succession of facets is arranged in such a way as to form, over all or part of the length of each evacuation groove, an alternation of portions of lesser depth and/or width, known as "compression corridors" and portions of greater depth and/or width known as "depression chambers". These variations in depth and/or width may be fairly regular or, on the other hand, may be random.

Such a configuration makes it possible, when using the drill bit, to exploit and to sustain locally, in the evacuation grooves, a phenomenon of pressurizing and depression of the drilling dust in order to improve its evacuation. Thus, first of all, the dust is compressed in the "compression corridors", thus storing up energy; then this stored energy is restored, as the dust relaxes in the "depression chambers". In addition, constant control of the pressurizing of the drilling dust, along the entire length of the body of the tool, prevents this dust from dropping back down into the bottom of the bored hole under the effect of gravity.

It is clear that the succession of facets in the perforating drill that is the subject of the invention defines the spatial or volume-wise configuration of the grooves of this drill bit, or in other words defines the overall shape of the drill bit, and cannot be likened to a surface finish like the one that results from the striations or flutes in the documents of the prior art sited above. Bearing in mind the foregoing explanations, it is also evident that the succession of facets produces, while the drill bit is in use, a volume-wise action rather than a surface action.

Another possible consequence of this configuration is that it causes the thickness of the web and/or of the margins (or guide beads) of the drill to vary, depending on whether or not the profile is symmetric with respect to the longitudinal axis of the tool. In the latter case, irregularities at the margins allow the drill-guidance function to be optimized (through the presence of "broad" regions) in the hole, while at the same time limiting friction against the walls of the hole (through the presence of "narrow" regions). In addition, in the regions where the margin is broad, a support is obtained with resistance to compression at the fillet radii, or connections of some other shape, which constitute the "compression corridors".

By virtue of this operation and in particular by virtue of the pressurizing/depression effect sustained, the process of evacuating the dust is enhanced, and may be optimized by making the volume offered for evacuation sufficiently large. This then yields an improvement in the speed of drilling, and this itself makes it possible to lengthen the life of the drill bit, as the better evacuation of the dust limits the forces on the body of the tool.

Furthermore, whereas the evacuation grooves in conventional drill bits have of necessity to be obtained by continuous spiral machining, the facets delimiting the evacuation grooves in the drill bit that is the subject of the invention can be produced by straight or non-straight passes of one or more tools with the removal of material, but can also be obtained by methods that deform the material of which the body of the drill bit is made, particularly by forging, this making it possible to reduce the cost of manufacture of the drill bits concerned.

The invention will be better understood with the aid of the description which follows, with reference to the appended schematic drawing which, by way of examples, depict several embodiments of this perforating drill.

FIG. 1 is a side view of a drill bit according to the invention in a first embodiment;

FIG. 2 is a partial view in perspective, on a larger scale, showing the detail of the head region of the drill bit of FIG. 1;

FIG. 3 is another side view of this drill bit, in the direction of arrow F1 of FIG. 1;

FIG. 4 is a view in cross section of the same drill bit on V–IV [sic] of FIG. 3;

FIG. 5 is another view in cross section on V—V of FIG. 3;

FIG. 16 is a side view of a drill bit according to the invention in a fourth embodiment;

FIG. 17 is a partial view in perspective, on a larger scale, showing the detail of the head region of the drill bit of FIG. 16;

FIG. 18 is another side view of this drill bit in the direction of arrow F4 of FIG. 16;

FIG. 19 is a view in cross section of the same drill bit on XIX—XIX of FIG. 18;

FIG. 20 is another view in cross section on XX—XX of FIG. 18.

Figure 6:
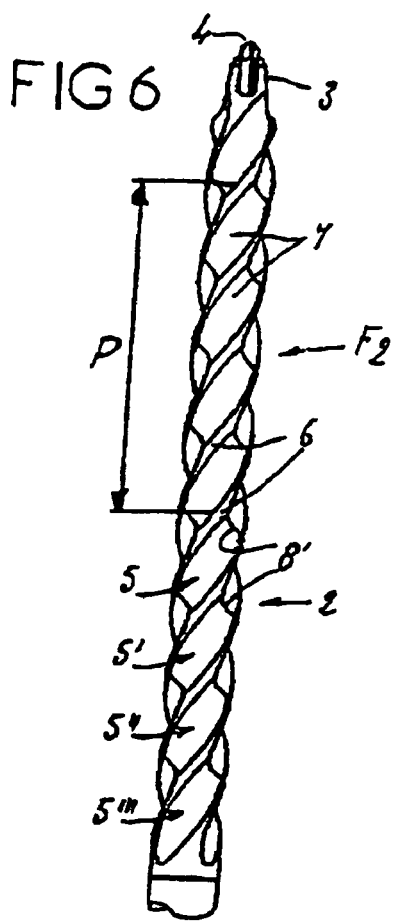
FIG. 6 is a side view of a drill bit according to the invention in a second embodiment.

The figures depict various forms of embodiment of a perforating drill comprising, in general, a drill body 2 of cylindrical appearance, ending at one end in a head 3 provided with a carbide insert 4, while the other end (not visible) of the drill body 2 is designed to be clamped. Over at least a fraction of the length of the drill body 2, starting from the head 3, there extend evacuation grooves 5 of spiral overall appearance, which serve to evacuate the dust during the boring of a hole using the drill bit. The evacuation grooves 5 are separated from one another by raised parts 6, of spiral overall appearance, generally denoted "margins".

According to the invention, each evacuation groove 5 is delimited by a succession of facets 7. More specifically, in the first embodiment illustrated in FIGS. 1 to 5, the facets 7 of the evacuation grooves 5 are connected to one another by connecting regions 8 which have a certain radius of curvature.

The margins 6 for their part have a regular or irregular alternation of narrow regions 9 and broad regions 10.

In the example depicted in FIGS. 1 to 5, the drill bit has two evacuation grooves 5 and 5' and the shapes described above both for these grooves 5 and 5' and for the margins 6 repeat at a pitch P.

When the drill bit is in use, the facets 7 of the evacuation grooves 5 and 5' form, with the wall of the bored hole, "depression chambers", while the connecting regions 8 act as "compression corridors".

The two grooves 5 and 5', with their facets 7 and their fillet radii 8, can be produced here by multi-groove cutting on spiral generatrices which follow a path which regularly or irregularly alternately diverges from and converges toward the longitudinal axis of the drill bit, these generatrices being angularly and axially offset from one groove to the next, to form the particular shapes of the evacuation grooves 5 and 5' with their facets 7 and their fillet radii 8.

Figure 7:
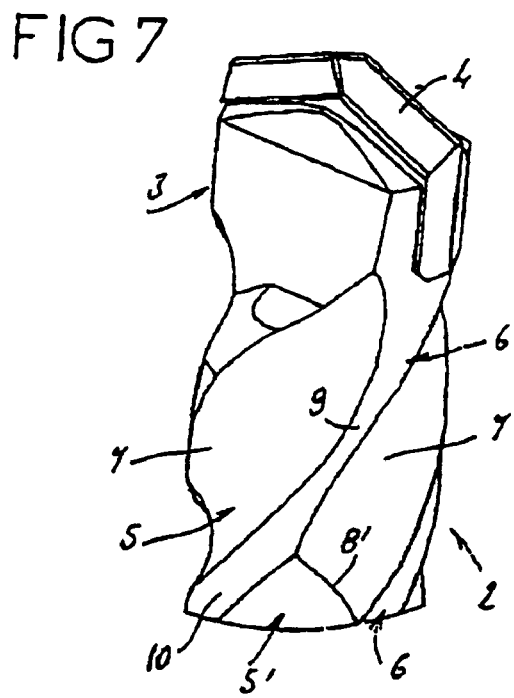
FIG. 7 is a partial view in perspective, on a larger scale, showing the detail of the head region of the drill bit of FIG. 6.
Figure 8:
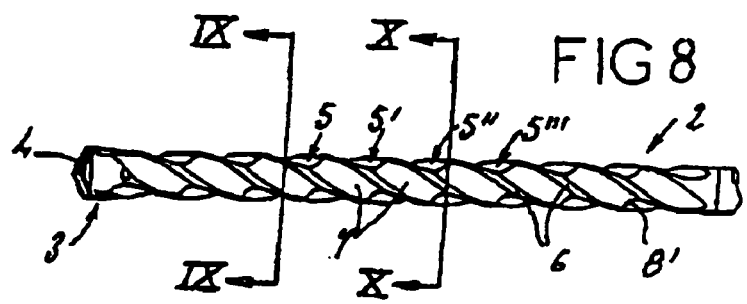
FIG. 8 is another side view of this drill bit in the direction of arrow F2 of FIG. 6.
Figure 9:
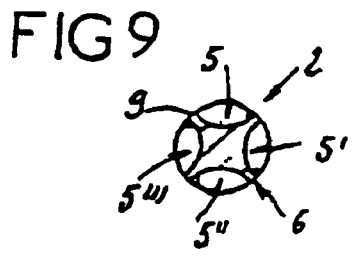
FIG. 9 is a view in cross section of the same drill bit on IX—IX of FIG. 8.
Figure 10:
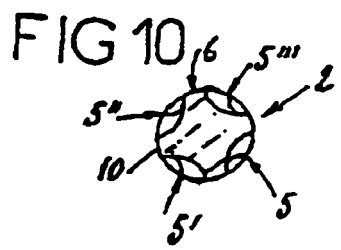
FIG. 10 is another view in section, on X—X of FIG. 8.

FIGS. 6 to 10 illustrate a first alternative form of the drill bit that is the subject of the invention, the elements which correspond to those already described being denoted therein by the same numerical references.

In this alternative form, the drill body 2 has four evacuation grooves 5, 5', 5" and 5'" of spiral overall appearance. These grooves are characterized by successive facets 7, of rounded profile, which meet along lines 8' forming edges, without a fillet radius. In addition, from one groove to the next, the generatrices defining the facets 7 and their connections 8' have an axial offset, but have no angular offset.

Figure 11:
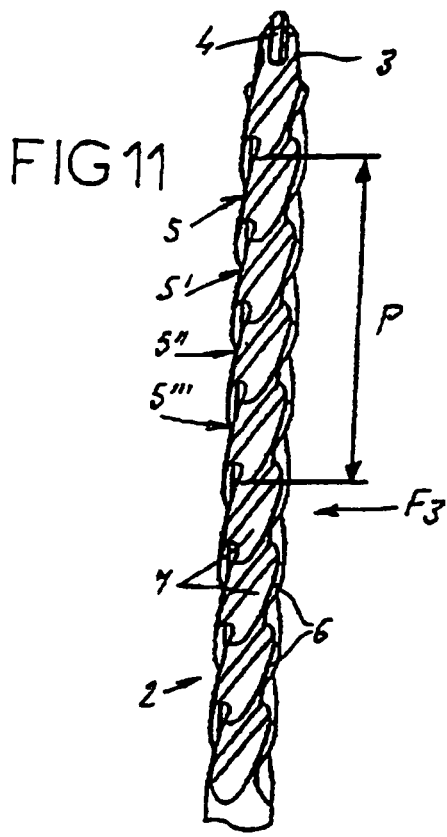
FIG. 11 is a side view of a drill bit according to the invention, in a third embodiment.
Figure 12:
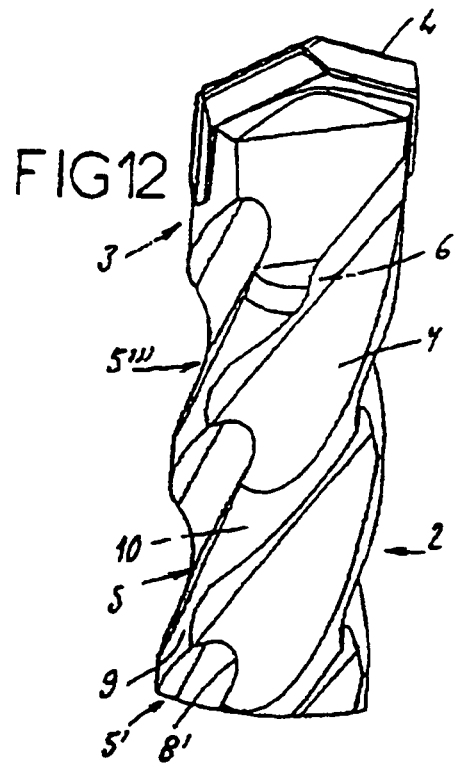
FIG. 12 is a partial view in perspective, on a larger scale, showing the detail of the head region of the drill bit of FIG. 11.
Figure 13:
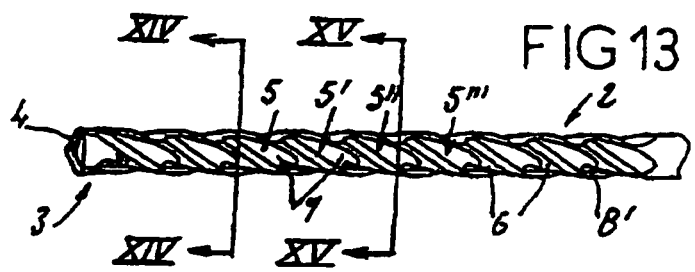
FIG. 13 is another side view of this drill bit, in the direction of arrow F3 of FIG. 11.
Figure 14:
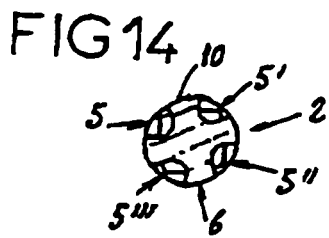
FIG. 14 is a view in cross section of the same drill bit on XIV—XIV of FIG. 13.
Figure 15:
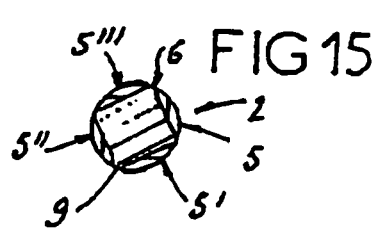
FIG. 15 is another view in cross section on XV—XV of FIG. 13.

FIGS. 11 to 15 illustrate a second alternative form similar to the embodiment of FIGS. 6 to 10 and again, in particular, comprising a drill body 2 with four evacuation grooves 5, 5', 5" and 5'". The facets 7 of these grooves here also comprise radiusless connections 8' and are defined by generatrices which have an axial offset but have no angular offset from one groove to the next. In contrast to the previous exemplary embodiment, the evacuation grooves 5 to 5', here do not have a rounded profile.

Finally FIGS. 16 to 20 illustrate a third alternative form in which the drill body 2 has three evacuation grooves 5, 5' and 5", with facets 7 comprising radiusless connections 8' and defined by generatrices which have an axial offset, but with no angular offset from one groove to the next. The evacuation grooves 5, 5' and 5" here have a nonrounded profile.

The following would not constitute a departure from the context of the invention as defined in the appended claims:

if a modification were to be made to the number of dust evacuation grooves formed in the body of the drill bit or the configuration of the head of this drill bit and of its carbide insert, or even if this insert were to be omitted;

if a modification were to be made to the number of facets delimiting said grooves, and to the shapes of these facets, which can be simple or complex, spread out in the lengthwise or widthwise direction, flat or concave or convex, etc.

if the facets were to be joined together with any radius of curvature ranging from a zero value (corresponding to a sharp edge) to high values;

if the facets and their connections were to be produced by any machining or forming processes;

if this drill bit were to be destined for and adapted to the drilling of all types of materials: stone, concrete, metal, etc.

The invention claimed is:

1. A perforating drill comprising a body of cylindrical overall shape, ending in a head and having, over at least part of the length of its body, one or more generally spiral evacuation grooves separated by margins of generaly spiral appearance, wherein the evacuation groove or grooves are delimited, over at least part of their length, by a succession of facets joined together, the succession extending longitudinally along the body and forming over all or part of the length of each evacuation groove, an alternation of first portions of lesser depth and/or width and second portions of greater depth and/or width.

2. The perforating drill as claimed in claim 1, wherein the facets of the evacuation grooves are joined together by sharp edges.

3. The perforating drill as claimed in claim 1, wherein the facets of the evacuation grooves are joined together by fillet radii of convex or concave shape.

4. The perforating drill as claimed in claim 1, wherein the margins, exhibit a uniform or non-uniform alternation of narrow regions and broad regions.

5. The perforating drill as claimed in claim 1, wherein generatrices defining the facets and their connections exhibit an axial offset and an angular offset from one groove to the net.

6. The perforating drill as claimed in claim 1, wherein generatrices defining the facets and their connections exhibit an axial offset but have no angular offset from one groove to the next.

* * * * *